United States Statutory Invention Registration [19]

[11] Reg. Number: H968

Moyles [43] Published: Oct. 1, 1991

[54] SELF LOCKING LOOP CLAMP

[76] Inventor: Mervyn W. Moyles, 20560 Reid La., Saratoga, Calif. 95070

[21] Appl. No.: 615,954

[22] Filed: Nov. 20, 1990

[51] Int. Cl.[5] ..... F16M 13/00
[52] U.S. Cl. ..... 248/74.5
[58] Field of Search ..... 248/74.5, 68.1, 74.3, 248/74.2, 230, 231; 24/16 PB

[56] References Cited

U.S. PATENT DOCUMENTS

| | | | |
|---|---|---|---|
| 2,404,473 | 7/1946 | Chunn | 248/74.3 |
| 2,417,245 | 3/1947 | Eggert et al. | 248/74.3 |
| 2,655,703 | 10/1953 | Flora | 248/74.3 X |
| 3,376,004 | 4/1968 | Goldman | 248/74.3 |
| 3,421,187 | 1/1969 | Ryder | 248/74.3 X |
| 3,460,788 | 8/1969 | Goldman | 248/74.3 |
| 3,995,795 | 12/1976 | Hogan | 248/68.1 |
| 4,844,379 | 7/1989 | Umehara | 248/74.3 |

FOREIGN PATENT DOCUMENTS

| | | | |
|---|---|---|---|
| 507844 | 11/1954 | Canada | 248/74.3 |

*Primary Examiner*—Michael J. Carone

[57] ABSTRACT

A one piece clamp for a bundle of wires is formed from a strip of material having spring, such as metal or plastic, the strip being padded to avoid cutting the wires, one end of the strip having a keyed tang and the other end having a slotted aperture, the tang being retracted radially so that the key passes through the slot into the aperture, and then released so that a wider portion of the tang cannot pass through the slot.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SELF LOCKING LOOP CLAMP

FIELD OF THE INVENTION

This invention pertains to a method and apparatus for clamping a bundle of wires, in particular to an apparatus which is one piece and is self-locking.

BACKGROUND OF THE INVENTION

Securing bundles of cables or tubes in tight quarters can be difficult for the installer. Multiple operations involving installing a clamp, aligning it, and fastening the clamp in frame inside a restricted space can be exasperating and require more hands than the installer can find room for in the apparatus.

OBJECTIVES OF THE INVENTION

It is therefore a primary objective of the present invention to eliminate steps in installing cables in situ.

It is another object of the invention to devise a one piece clamp which can be installed on a cable without tools.

It is a further object of the invention to devise a clamp for a bundle of wires which can be installed on the bundle with one hand as the need arises.

SUMMARY OF THE INVENTION

These objects of the invention and other objects, features and advantages to become apparent as the specification progresses are accomplished by the invention according to which, briefly stated, a one piece clamp is formed from a strip of material having spring, such as metal or plastic, the strip being padded to avoid cutting the wires, one and of the strip having a keyed tang and the other end having a slotted aperture, the tang being retracted radially so that the key passes through the slot into the aperture, and then released so that a wider portion of the tang cannot pass through the slot.

LIST OF ADVANTAGES OF THE INVENTION

An important advantage of the present invention is that the clamp is self locking and needs no fastener to be held in place on a bundle of wires.

A further advantage is that the clamp may be fastened to the cable on the bench before attachment to a frame.

Another advantage is that the clamp can be installed with one hand under some circumstances.

A still further advantage is that the clamp can be installed without tools.

These and further objectives, constructional and operational characteristics, and advantages of the invention will no doubt be more evident to those skilled in the art from the detailed description given hereinafter with reference to the figures of the accompanying drawings which illustrate a preferred embodiment by way of non-limiting example.

Glossary

The following is a glossary of elements and structural members as referenced and employed in the present invention.

10—clamp
12—frame
14—tubing or soft padding
16—upper foot
18—lower foot
20—tang
22—slotted aperture
24—narrowed region of tang, or key
26—aperture
28—slot
30—screw hole

DESCRIPTION OF THE PREFERRED EMBODIMENTS

Figure 1:
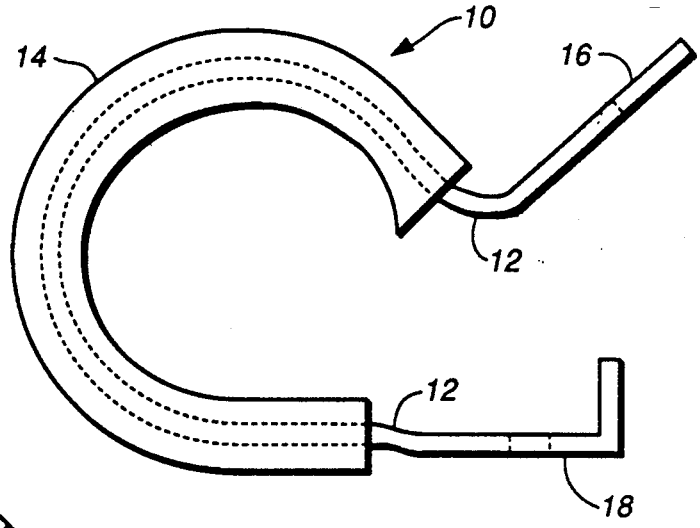
FIG. 1 shows a side view of the clamp according to the invention in an open position before use.
Figure 2:
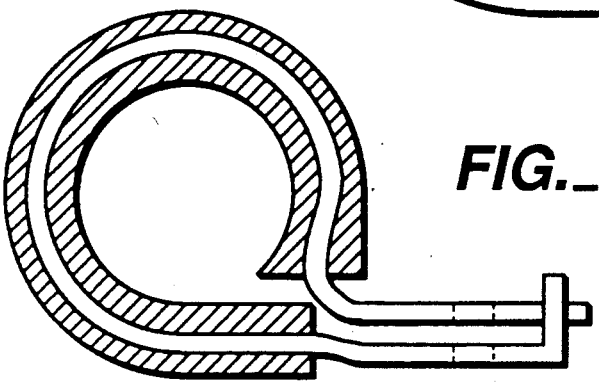
FIG. 2 shows a side view of the clamp according to the invention in a locked position.
Figure 3:
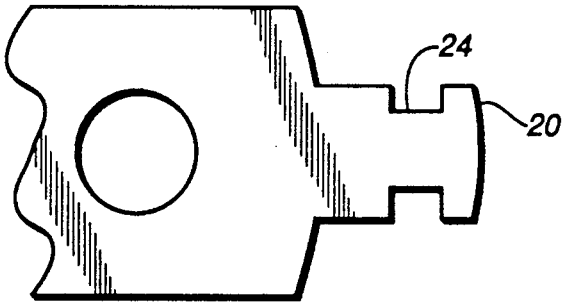
FIG. 3 shows a detail of the upper foot in a top view.
Figure 4:
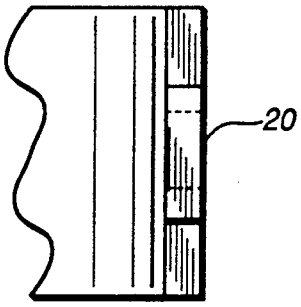
FIG. 4 is an end view of the detail of FIG. 3.
Figure 5:
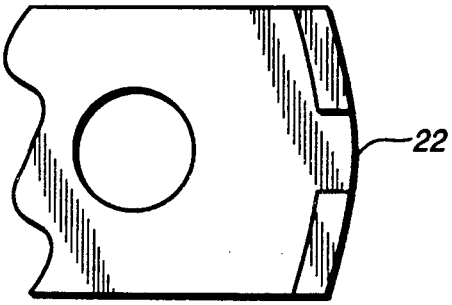
FIG. 5 shows a detail of the lower foot in a top view.
Figure 6:
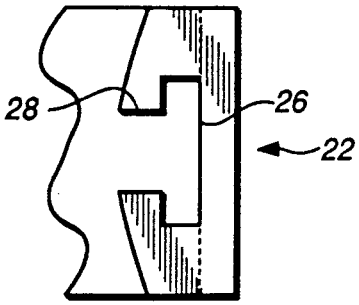
FIG. 6 is an end view of the detail of FIG. 5.

Referring now to the drawings wherein like reference numerals are used to designate like or corresponding parts throughout the various figures thereof, there is shown in FIG. 1 the clamp apparatus 10 according to the invention in a free condition before use on a cable. The frame 12 is a one piece strip of metal, hard rubber, plastic or other suitable material with spring. A soft tubing 14 or padding is placed around the central portion of the clamp 10 to prevent the clamp from damaging the wires when closed around the wires. The ends of the clamp are an upper foot 16 and a lower foot 18.

In the preferred embodiment, the upper foot has a tang 20 and the lower foot has a slotted aperture 22. The key or narrowest part of the tang 20 is sized to match the slotted aperture 22.

The entire tang 20 is a narrowing of the end of the strip from which the clamp is made. A narrowed region 24 of the tang 20 is set back from the tip of the tang 20 by a distance sufficient to provide structural integrity; the distance of the set-back should be of at least the same size as the depth of the narrowing. The narrowing should be about as wide as it is long. In the preferred embodiment shown here, the narrowing is accomplished by forming two square notches symmetrically on opposing side of the tang. In alternate embodiments the notches could be other shapes or a single notch could be formed on one side of the tang.

The lower foot is shaped by forming an aperture 26 and a slot 286 in the end of the clamp 10 and bending the end of the clamp so that the aperture and slot project toward the upper foot.

In use, the clamp is placed over the bundle of wires or tubes, and the upper foot and lower foot are brought into contact. The upper foot is retracted slightly (radially) such that the key in the upper foot passes through the slot in the lower foot. As the upper foot is releases, it advances radially bringing the wider portion of the tang into the aperture. Since the wider portion of the tang cannot pass through the small slot, the clamp is locked in place by the inherent tendency of the clamp to spring open and expand radially.

Self-locking loop clamps can be installed on cables as a bench operation, rather than in final installation. The clamps are thus in place, located along the length and at the correct azimuth. The installer then has only to find the attach point to the frame and install a screw through the screwhole 30. Without the self-locking clamp the installer has the additional burden of locating the clamp along the cable, locating the attach point, closing the clamp, inserting the screw to effect clamp closure, and then torquing the screw to make the attachment. In restricted quarters and limited access for tooling, the task is often difficult.

This invention is not limited to the preferred embodiment and alternative heretofore described, to which variations and improvements may be made, without departing from the scope of protection of the present patent and true spirit of the invention, the characteristics of which are summarized in the following claims.

What is claimed is:

1. An apparatus for clamping a bundle of wire, comprising:

a strip of material having spring, a central region of said strip being padded to avoid cutting the wires, a first end of said strip having a keyed tang, a second end of said strip having a slot and an aperture, said slot and said aperture being adjoining, said strip being bent so that said first end almost touches said second end, said strip being bent to position said first end relative to said second end so that when said tang is retracted radially, said key can pass through said slot into said aperture, and when said tang is released, a wider portion of said tang cannot pass through said slot.

* * * * *